United States Patent [19]

Eversdijk

[11] 4,434,027
[45] Feb. 28, 1984

[54] METHOD FOR THE EVAPORATION OF A LIQUID SOLUTION USING MECHANICAL COMPRESSION

[75] Inventor: Bastiaan P. Eversdijk, Re Gorredijk, Netherlands

[73] Assignee: Stork Friesland B.V., Gorredijk, Netherlands

[21] Appl. No.: 396,852

[22] Filed: Jul. 9, 1982

Related U.S. Application Data

[63] Continuation of Ser. No. 242,183, Mar. 10, 1981, abandoned.

[30] Foreign Application Priority Data

Mar. 17, 1980 [NL] Netherlands ............... 8001576

[51] Int. Cl.³ .................... B01D 1/26; B01D 1/28
[52] U.S. Cl. .................... 159/47.1; 159/17 P; 159/24 B; 159/46; 159/DIG. 8; 203/26
[58] Field of Search ........... 203/24, 26; 159/24 R, 159/24 B, 24 A, 17 R, 17 P, 47 R, 46, DIG. 8

[56] References Cited

U.S. PATENT DOCUMENTS

| | | | |
|---|---|---|---|
| 2,979,442 | 4/1961 | Badger | 159/46 |
| 3,257,290 | 6/1966 | Starmer | 159/24 R |
| 3,416,318 | 12/1968 | Chocquet | 159/24 R |
| 3,489,654 | 1/1970 | Geiringer | 159/17 P |
| 3,807,479 | 4/1974 | Brannland et al. | 159/17 P |

*Primary Examiner*—Bradley Garris
*Attorney, Agent, or Firm*—Laurence R. Brown

[57] ABSTRACT

A liquid solution is passed through a multi-stage evaporation plant while using recirculated vapor, fed through a mechanical compressor in order to increase the pressure and temperature of the vapor.

The plant comprises a number of evaporators connected in series and split up into a plurality of groups, which comprise a decreasing number of evaporators; as seen in the flow direction—the vapor being fed in parallel, streams through said groups.

2 Claims, 5 Drawing Figures

METHOD FOR THE EVAPORATION OF A LIQUID SOLUTION USING MECHANICAL COMPRESSION

This application is a continuation of application Ser. No. 242,183, filed Mar. 10, 1981, now abandoned.

BACKGROUND OF THE INVENTION

1. Field of the Invention

The present invention relates to a method of condensing a liquid solution in a plant adapted to evaporation, more particularly a multi-stage plant adapted to an evaporation of milk, a mechanical compression of the treatment vapour being carried out so as to have the the former regain its initial temperature and pressure, is used in the subsequent stage with a lower boiling point of the product, in view of successively increasing the dry substance contents of the product by evaporation.

2. Description of the Prior Art

It is known per se that the use of a single-stage compressor in a similar method will cause the rise in pressure and temperature to be restricted, so that in multi-stage evaporators the heating surface has to be enlarged. Consequently the liquid load upon the pipe(s) will become insufficient so that dry boiling will occur in some parts of the plant, whilst a pollution (crustation) of the heat exchanging surfaces (the pipes) cannot possibly be avoided. These phenomena will especially occur in the last stages whereat, due to the higher dry substance contents, the heat transfer coefficient will be decreased, so that a greater surface will be required.

Efforts have been made to overcome this problem by dividing (splitting up) the pipes into a number of sections (so-called passes) and by having these sections pass the product connected in series. This causes the load on the pipe(s) to be so increased that any danger of dry boiling is restricted to a minimum. Said division, however, will substantially increase the costs of investment, due to the necessity of providing additional housings, pumps, lines and drop separators. Although a higher initial level of temperature and pressure of the treatment vapor can actually be obtained by the use of a multi-stage compresser, the costs of investment will also be considerably increased by the latter measure.

SUMMARY OF THE INVENTION

It is a primary object of the present invention to provide a method which does not require a division into stages, but which, nevertheless, provides a sufficiently great difference in temperature between the condensing treatment vapor on the one hand and the boiling point of the product on the other hand, dependent upon the heat transfer coefficient and so, upon the dry substance contents of the product flowing through the respective stage.

This object is attained according to the invention in that the evaporators connected in series and designed for the passage of the product, are split up into a plurality of groups. while the lines for the incoming and outgoing vapor per group, are connected in parallel with the outlet and inlet line of the mechanical compressor.

Due to these measures the necessity of dividing the stages can be avoided and the total difference in temperature which the compressor is able to generate, is used in the relative groups.

The method in accordance with the present invention is preferably carried out in such a way that—as seen in the direction of the product flow—groups are formed, comprising a decreasing number of evaporators, the last groups consisting of a single evaporator. Said latter evaporator through which the product having the greatest dry substance contents flows, can be so installed in the vapor circuit that the maximally available difference in temperature between the condensing vapor on the one hand and the liquid solution on the other hand, is used in said evaporator.

In accordance with the invention the liquid solution is initially fed to the group having the greatest number of evaporators, said solution successively passing groups, comprising a decreasing number of evaporators, the last passage being accomplished through the evaporator being installed between the inlet and outlet vapor lines of the compressor. The previous groups of stages (evaporators) through which the respective products have passed may be composed such that the difference in temperature available per stage becomes as favorable as possible with respect to the dry substance contents of the product flowing therethrough. The latter measure avoids a splitting up of the respective stages.

The invention is likewise embodied in a multi-stage plant for evaporating a liquid solution, while applying the method as described hereinbefore, said plant comprising a plurality of evaporating stages, each consisting of an evaporator and a drop separator, lines and pumps for conveying the liquid solution through the plant, lines for the treatment vapor and a mechanical compressor, as well as lines for a discharge of condensate. In accordance with the present invention, the liquid solution in said plant passes the evaporating stages in series, said stages being divided into a plurality of groups, comprising a decreasing number of evaporating stages, while the treatment vapor being supplied and discharged per group, is connected in parallel with the outlet and inlet lines of the mechanical compressor.

It should be noted that the use of mechanical compression of exhaust vapor from an evaporating plant, has been effected previously in practice, however without obtaining the beneficial effect as provided in the combination of features according to the present invention.

The features of the present invention which are believed to be novel are set forth with particularity in the appended claims.

Other claims and many of the attendant advantages will be more readily appreciated as the same becomes better understood by reference to the following detailed description and considered in connection with the accompanying drawings which first show the state of the art and finally, two embodiments of a plant in which the method according to the invention is carried out and in which like reference symbols designate like parts throughout the figures.

DESCRIPTION OF A PREFERRED EMBODIMENT

Figure 2:
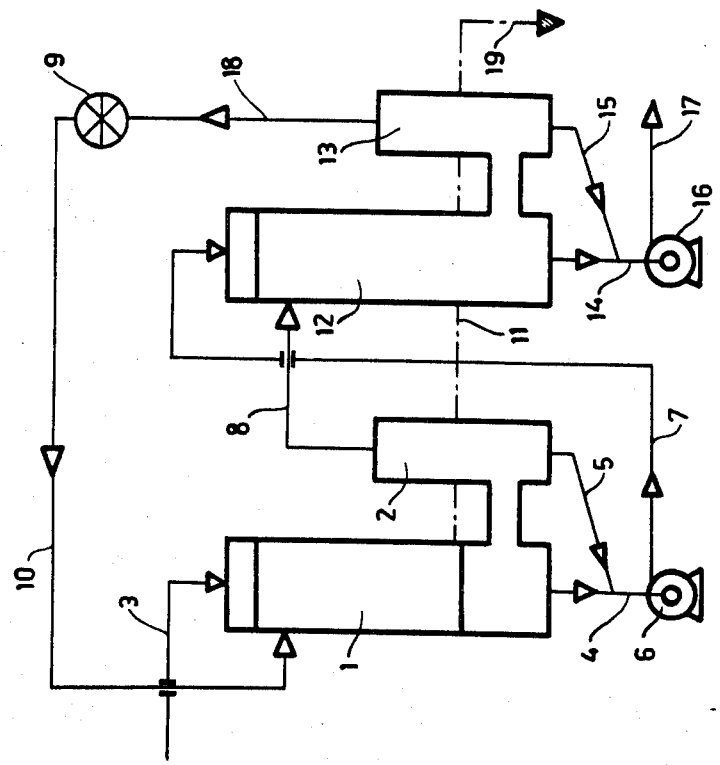
FIG. 2 is a dual-stage evaporator, also with mechanical compression.
Figure 1:
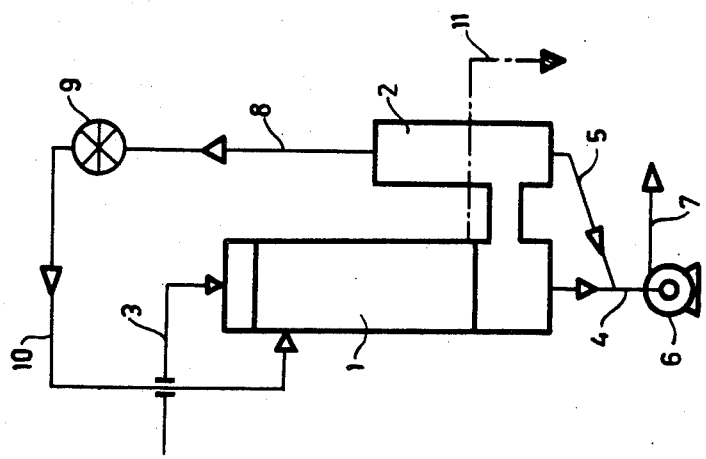
FIG. 1 is a schematic view of a single-stage evaporator with mechanical compression.

Initially referring to FIGS. 1 and 2, the basic concept is illustrated of a single-stage and multi-stage evaporator having mechanical compression. In case that these evaporators are destined to remove Q-ton water/hrs. from an identical product flow, a difference in temperature of $\Delta T°C$. between the inlet and outlet vapor of the compression occurring, said compressor requiring for said vapor a specific capacity of $\epsilon$ kW/ton°C. of vapor, it appears that the following compression power is required:

Single-stage evaporator: $Q\Delta T.\epsilon$ kW/hrs.;
Dual-stage evaporator: $\frac{1}{2}Q\Delta T.\epsilon$ kW/Hrs.

In the single-stage and dual-stage evaporator of FIGS. 1 and 2, liquid solution to be condensed is supplied via a line 3 and discharged via a line 4, after having traversed the evaporator 1. The liquid caught in a drop separator 2, is via a line 5, combined with the liquid from line 4 and flows toward a pump 6 discharging the condensed liquid via a line 7, toward another location in the single-stage evaporator or toward evaporator 12 in the dual-stage plant (FIG. 2), to wit toward the subsequent stage of said plant. In the single-stage evaporator of FIG. 1, the vapor being released from the drop separator 2 is via a line 8, conveyed to a compressor 9. Said vapor having been increased in temperature and pressure by said compressor 9, is fed back to the evaporator of the first stage via line 10. The condensate formed in the evaporator 1 is discharged via a line 11.

In the dual-stage evaporator of FIG. 2 the vapor being released from the drop separator 2 is, via a line 8, fed to the evaporator 12 of the second stage. The vapor being released from the liquid solution, is fed to the compressor 9 via the drop separator 13 and line 18. The condensate formed in the evaporator 1 is either discharged through line 11 or is used in evaporator 12 and is then, together with condensate formed in the latter evaporator, discharged via line 19.

Although the dual-stage evaporator of FIG. 2 presents considerable advantages as compared with the single-stage evaporator of FIG. 1, especially with a view to power consumption, said dual-stage evaporator has the drawback that presently only half the difference in temperature, to wit $\frac{1}{2}\Delta T°C$. between the condensing vapor and the boiling product, is available in each stage. Consequently the surface required for the heat transfer has to be twice as large as in a single-stage evaporator, so that the costs of the plant of FIG. 2 are much higher. Since furthermore the heat transfer coefficient will decrease proportionally to the increase in dry substance contents of the liquid solution (the product), the later stages of said evaporator have to be provided with relatively still more heat transfer surface(=pipes). This implies that, when the product passes through pipes being connected in parallel, the liquid load per pipe will decrease to such an extent that a drying out of said pipe may be threatening which will incur a crustation and will therefor hamper the cleaning operation, which operation will have to be performed much more frequently.

Figure 3:
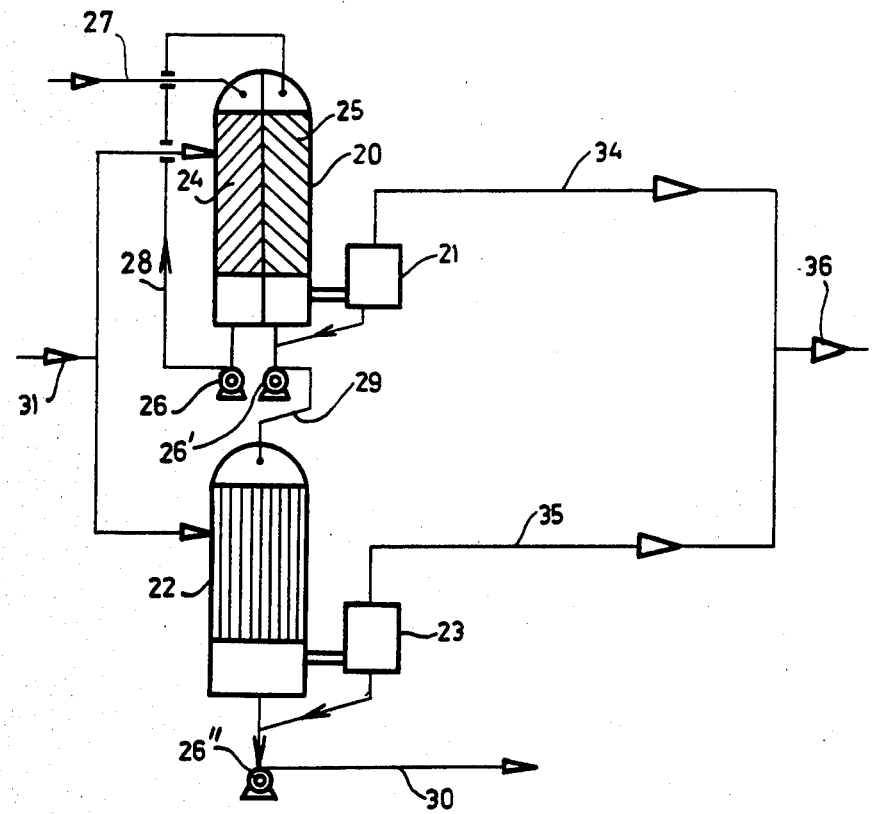
FIG. 3 is a single stage of an evaporating plant, said stage having been divided both internally and externally.

A method known per se, which avoids the aforementioned problem, consists in an increase of the applied difference in temperature $\Delta T$. The latter can be obtained by applying a multi-stage compressor which, however, considerably increases the costs of instalment. Referring now to FIG. 3 another possibility consists in splitting up the stages whereby the pipes from a certain stage are divided into a plurality of groups, connected in series through which the liquid solution (the product) is passed. This so increases the liquid load per pipe, that the phenomena of dry boiling and crustation involved therewith will be considerably reduced. The relative stage is divided into two sections, built up from an evaporator 20, 22, respectively and a drop separator 21, 23, respectively. This arrangement is the so-called external division.

Inside the evaporator 20 an internal division has been performed, as the bundle of pipes arranged in said evaporator consists of portions 24 and 25. The solution flows toward the the bundle 24 of pipes via line 27, said solution being subsequently conveyed toward the bundle 25 of pipes by means of a pump 26, via line 28. Thereupon the condensed liquid solution is pumped away from the latter bundle by means of a pump 26' and flows via line 29, toward the bundle of pipes of evaporator 22. After having passed said evaporator, the solution is further conveyed via line 30, by means of a pump 26". The figure further shows a vapor feed 31, being divided toward the two evaporators 20 and 22. The outlet lines 34 and 35 for vapor released from the drop separators 21 and 23 merge together in the outlet line 36. Splitting up the illustrated stages will involve substantially higher costs of instalment, in view of the use of additional evaporating sections, pumps, lines and drop separators. As mentioned hereinbefore the above identified features form part of the known state of the art.

Figure 4:
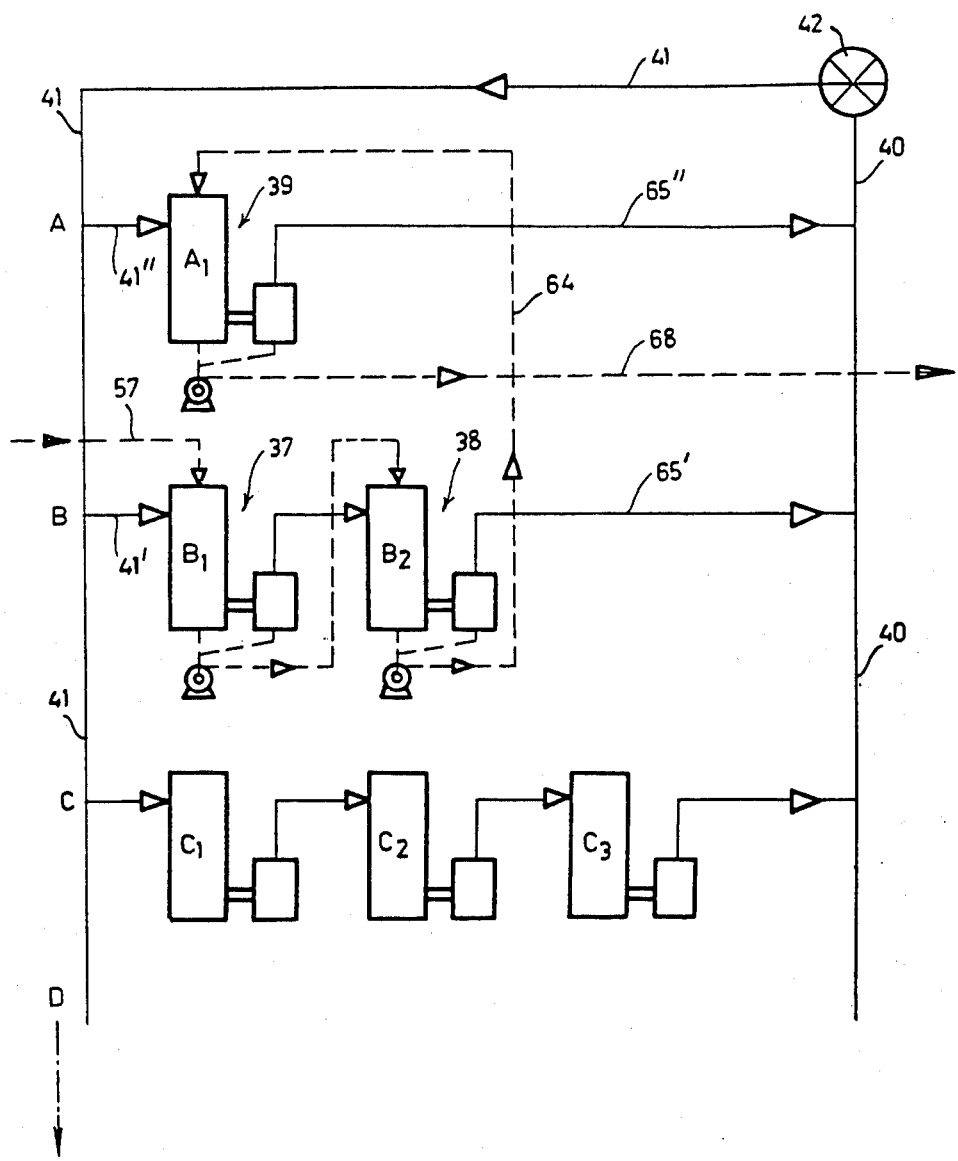
FIG. 4 is the principle of the arrangement in accordance with the present invention.
Figure 5:
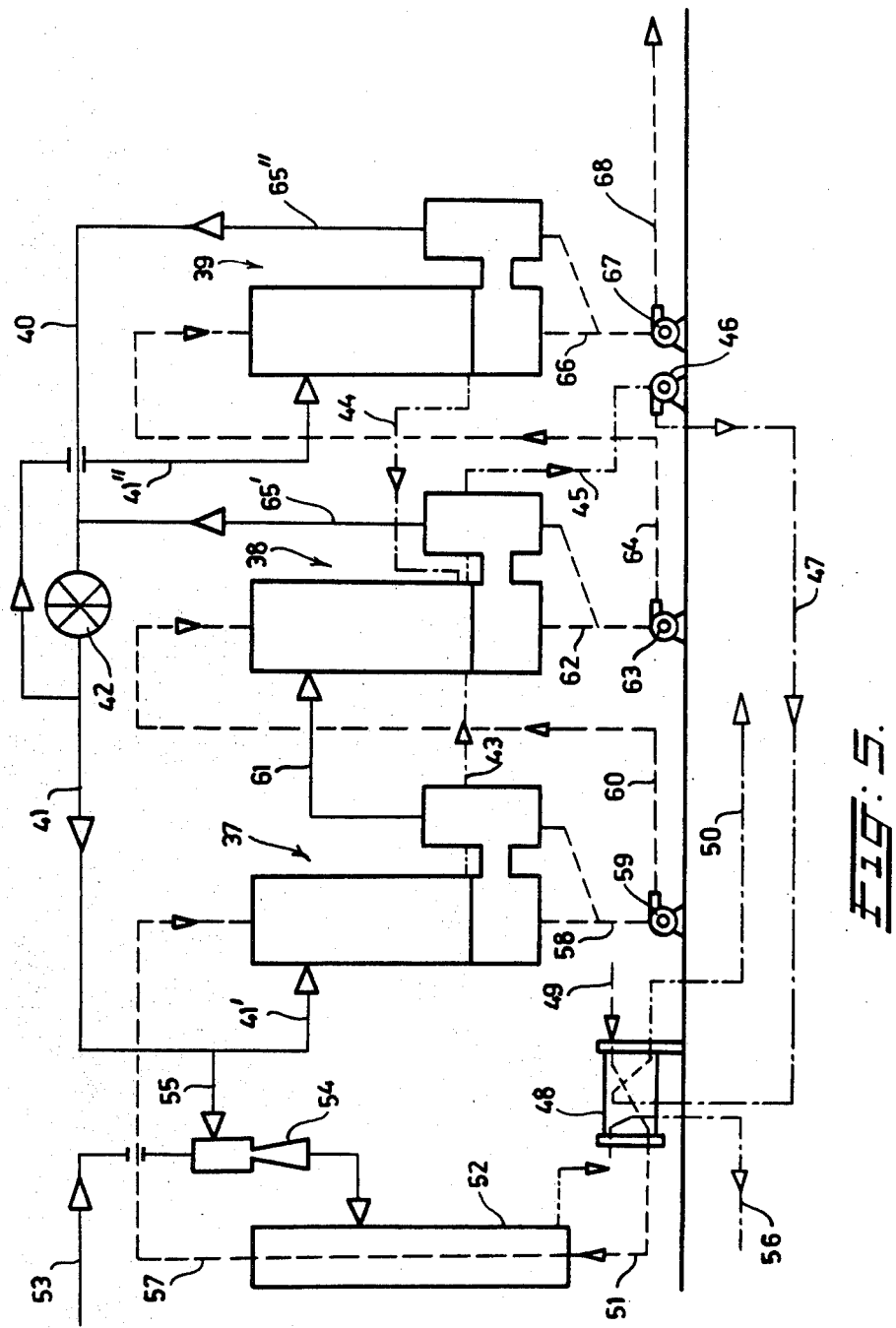
FIG. 5 is a schematic view of an embodiment of a plant being built up from three evaporators.

Referring now to FIGS. 4 and 5, the present invention illustrated in said figures, avoids the necessity of a division into stages, as in each group the total difference in temperature $\Delta T$, which can be realized by the compressor 9, is used.

In FIG. 4 the circuiting principle of the treatment vapor in a multi-stage plant is illustrated, the evaporation stages being divided into groups C, B and A, having a decreasing number of evaporators, each group, relative to said treatment vapor, being connected in parallel with the inlet and outlet lines 40 and 41 of the mechanical compressor 42. The broken line in the figure shows the passage of product (solution) in a tri-stage plant consisting of the group of evaporators B and A, respectively, comprising the evaporators 37, 38 and 39. The product is introduced into the first stage 37 via inlet line 57, subsequently flows through the second stage 38 and is hereupon, via line 64, conveyed toward the third stage 39, after the passage of which, it is discharged via line 68.

Due to the aforedescribed manner of vapor circuiting, a multi-stage evaporating plant with mechanical compression can be so designed that the costs involved with its instalment, and the use of energy (power consumption), are as low as possible. Applying a mechanical compression in multi-stage evaporators, which is moreover very advantageous from an energetic viewpoint, can be effected sooner, since the relative instalment costs are much lower in comparison with a thermal compression, due to the fact that in the system according to the present invention, the necessity of splitting up stages has become superfluous.

The schematic view of FIG. 4 further illustrates a group C built up from three evaporators, being connected in series. Should the use of the latter be desired, the product inlet 57 is connected with device $C_1$, whilst the outlet of $C_3$ is connected with evaporator 37 of group B. The three groups A, B and C are, connected in parallel, installed between the inlet and outlet lines 40 and 41 of compressor 42. The latter installation can be extended by additionally installing a fourth group D, etc.

The numerals of FIG. 4 correspond to those of FIG. 5, which latter figure is an example, illustrated schematically, of an evaporating plant consisting of a group of two first evaporators 37 and 38, being connected in series, and a last evaporator 39, the group of two evaporators and the last one, being arranged in parallel between the incoming vapor line 40 and the outgoing vapor line 41 of the compressor 42.

The condensate as formed in the first and third evaporator is, via lines 43 and 44, conveyed toward the second evaporator; the condensate gathered at that location has a relatively high temperature and is conveyed via line 45, pump 46 and line 47, toward a heat exchanger 48, consisting of plates, in order to increase the temperature of an incoming flow of product being supplied in counter flow via line 49, whereupon the cooled down evaporator condensate is discharged via line 50. The preheated product is via line 51, conveyed toward a pasteurizor 52 being heated by fresh vapor, derived from a line 53 which is mixed in a thermocompressor 54, with vapor from compressor 42, via a branch line 55 from line 41. The condensate discharged from pasteurizor 52 is used in a separate section of heat exchanger 48 in order to further heat the supplied product, prior to re-circulating same via line 56 to the fresh vapor circuit 53. The heat comprised in the condensate is in this manner used as much as possible, prior to discharging said condensate for a further use.

After having passed the pasteurization device the product is introduced into the first evaporator via inlet line 57 and is discharged from the last evaporator via lines 66 and 68, then containing the desired dry substance contents.

The example of FIG. 5 does not show several secondary heat exchangers which may be disposed in the vapor lines and used in order to have the temperature of the incoming product to be evaporated in the respective evaporator, sufficiently far exceed the boiling temperature of the product (liquid solution).

Although the present invention has been illustrated and described in connection with a preferred embodiment thereof, it will be apparent to those skilled in the art that many variations and modifications may be made without departing from the invention in its broader aspects. It is therefor intended to have the appended claims cover all such variations and modifications as fall within the true spirit and scope of the invention.

What is claimed is:

1. The method of evaporating a liquid solution product in an evaporator system to obtain a condensed drier substance therefrom, said system being adapted to deliver treatment vapor at a predetermined temperature and pressure for effecting evaporation and said system having similar multiple stages of similar evaporators with a specified evaporation surface coupled to process the product with the treatment vapor flowing in sequence from previous stages into subsequent stages comprising the steps of, restoring vapor energy consumed in product evaporation in the evaporator system by receiving treatment vapor processed through at least one stage and thereby losing pressure and temperature by mechanically compressing the vapor in a single stage compressor to restore its predetermined temperature and pressure as treatment vapor, serially passing spent vapor from a said previous stage with a high boiling point product into a said subsequent stage having a lowered boiling point product to capture the latent heat of the spent vapor released from the previous stage, thereby to increase the efficiency of obtaining the condensed substance from said product by evaporation, forming a plurality of groups, each group having different numbers of evaporator stages for receiving input treatment vapor and releasing outgoing spent vapor with the evaporator stages in each multiple stage group connected to process the liquid solution product in series from preceding to subsequent stages with input vapor into the groups comprising the mechanically compressed treatment vapor delivered from the compressor in parallel to all the groups and with output spent vapor provided in parallel from the groups to the compressor as the vapor to be mechanically compressed to provide a like total change in input energy from input to output of each group, and passing the product through the similar evaporator stages in a flow path progressing from the group having the greatest number of evaporator stages to the group having the least number of evaporator stages thereby to produce a larger energy change to the product in the evaporator stages receiving the solution in drier form than in previous evaporation stages.

2. The method of claim 1 including the step of processing the product through said groups wherein the product flows through a last group consisting of a single evaporator.

* * * * *